(12) United States Patent
Kuo et al.

(10) Patent No.: US 10,284,432 B1
(45) Date of Patent: May 7, 2019

(54) METHOD FOR ENHANCING QUALITY OF MEDIA TRANSMITTED VIA NETWORK

(71) Applicant: Kabushiki Kaisha Ubitus, Tokyo (JP)

(72) Inventors: Jung-Chang Kuo, Taipei (TW); Tzer-Jen Wei, Taipei (TW); An-Lun Teng, Taipei (TW); Yu-Ju Tseng, Taipei (TW); Rong Chiang, Taipei (TW)

(73) Assignee: Kabushiki Kaisha Ubitus, Tokyo (JP)

( * ) Notice: Subject to any disclaimer, the term of this patent is extended or adjusted under 35 U.S.C. 154(b) by 0 days.

(21) Appl. No.: 16/027,022

(22) Filed: Jul. 3, 2018

(51) Int. Cl.
*G06N 3/08* (2006.01)
*H04L 12/24* (2006.01)
*H04L 29/06* (2006.01)

(52) U.S. Cl.
CPC ............. *H04L 41/16* (2013.01); *G06N 3/088* (2013.01); *H04L 65/601* (2013.01); *H04L 65/607* (2013.01); *H04L 65/80* (2013.01); *H04L 67/42* (2013.01)

(58) Field of Classification Search
CPC ..... H04L 65/601; H04L 65/607; H04L 67/42; G06N 3/088
See application file for complete search history.

(56) References Cited

U.S. PATENT DOCUMENTS

| 7,813,822 B1 * | 10/2010 | Hoffberg | G06K 9/00369 |
| | | | 381/73.1 |
| 2017/0255845 A1 * | 9/2017 | Osindero | G06K 9/82 |

* cited by examiner

*Primary Examiner* — El Hadji M Sall

(57) ABSTRACT

A method for enhancing quality of media transmitted via network uses an AI enhancing model built-in the client device to enhance the quality of video streams received from network. The AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images that are generated by the server. Such that, the enhanced images are visually more similar to the raw images than the decoded images do.

13 Claims, 10 Drawing Sheets

METHOD FOR ENHANCING QUALITY OF MEDIA TRANSMITTED VIA NETWORK

BACKGROUND OF INVENTION

1. Field of the Invention

The invention relates to a method for enhancing quality of media transmitted via network, especially refers to a method for enhancing quality of images transmitted via network by using a pre-trained artificial intelligence (hereinafter "AI") enhancing model built-in the client device.

2. Description of the Prior Art

During the past years, online games have become more and more popular all over the world. With the development of cloud computing related systems and technologies, a technology for allowing a server to stream the game contents to provide services has been introduced.

A conventional way to provide such cloud-based online game service is to let the server do almost all of the calculations. Which means, when providing the online game service, a typical application is executed on the server to generate a virtual 3D environment containing multiple 3D objects including which can be controlled or moved by players. And then, based on the controlling result of the player, the server renders the virtual 3D environment together with the 3D objects into a 2D game screen to be shown on the payer's device. And then, the server encodes and transmits the rendered images to the player's device as a 2D video stream. The player's device then only needs to decode and "display" the 2D video stream, without the need to do the calculations of the 3D rendering. However, there are several issues to be considered when providing such cloud-based online game service, for example, high loading of the server for performing 3D rendering processes for a large number of players in the same time, degraded quality of graphical result caused by the encoding and streaming processes, and considerable consumption of communication bandwidth for transmitting the 2D video streams via the network.

One conventional approach to resolve the problem of degraded graphical quality is to increase the resolution of the raw images generated by the gaming application at the server side, and also to increase the transmission bitrate of images, that is, to decrease the compression ratio of the images when the server is encoding those raw images into 2D video stream. However, it is obvious that the loading of the server as well as the bandwidth consumption will both be severely increased due to higher resolution and transmission bitrate of images. For example, if the frame rate and encoding compression ratio are fixed, then, when the resolution of the raw images generated by the gaming application at the server side is increased from 720p to 1080p, then the transmission bitrate required and the calculation loading of sever will also be increased 2.25 times. In the other hand, if we try to decrease the bandwidth consumption and loading of the sever, then the quality of graphical result of gaming images will also be sacrificed. It becomes a dilemma when trying to maintain perfect image quality and economic bandwidth consumption in the same time.

Another approach to resolve such problem is either to use a lower resolution for the raw images generated by the gaming application at the server side, or to use a higher compression ratio for encoding the raw images into the 2D video stream, or both. Such that, the bandwidth consumption for transmitting the 2D video streams via the network can be decreased, although the quality of graphical result of gaming images is sacrificed. In the meantime, an image enhancing technology is employed in the client device. Once the client device receives the 2D video streams, the client device decodes the video streams and uses the image enhancing technology to improve the visual effects of images. Histogram equalization (HE) is one of the most popular image enhancement methods for enhancing image contrast owing to its simplicity and effectiveness. However, HE may cause excessive contrast enhancement and feature loss problems that result in an unnatural look and loss in details of the processed images. In addition, not only HE but also all other image enhancing technologies known in the art are encountering the same predicament, that is, they all try to use one single set of algorithms to handle various kinds of images having completely different graphical contents, and such idea is unfeasible. Taking cloud-based online game service as an example, graphical contents of raw images generated by the server might significantly varied when the gaming scenery is changed. For example, a gaming scenery of city might let the raw images of game to contain a plurality of buildings having simplified contours and different but generally unified colors. Another gaming scenery of dark cave might result the raw images of game to be monotonous in color with low Hue, Value and Chroma values, but have irregular yet obscure contours of landscape. A further gaming scenery of blossom garden might let the raw images of game to be full of vivid and colorful objects with detailed and complex contours. It is undoubted that, none of these image enhancing technologies known in the art can provide a good and acceptable quality of image-enhancing effect for all those various kinds of images having completely different graphical contents. Moreover, another predicament of all these image enhancing technologies known in the art is that, although the algorithms of these well-known image enhancing technologies are designed to improve the graphical effects such like contrast, sharpness, contrast and/or saturation of images, but those algorithms and parameters thereof are completely irrelevant to the original raw images. As a result, the enhancing processes performed by these well-known image enhancing technologies definitely will not make the enhanced images to be more visually similar to their corresponding raw images, and thus the game players in the client side won't be able to entirely enjoy the graphical effects that originally presented in the raw images generated by the gaming application at the server side.

SUMMARY OF THE INVENTION

Accordingly, it is the primary object of the present invention to provide a method for enhancing quality of media transmitted via network. The method uses an AI enhancing model built-in the client device, wherein the AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images that are generated by the server. Such that, the enhanced images are visually more similar to the raw images than the decoded images do.

It is another object of the present invention to provide a method for enhancing quality of media transmitted via network, which can decrease the loading of sever, improve the quality of images displayed on the client device, and save the bandwidth consumption between the client device and the server.

It is a further object of the present invention to provide a method for enhancing quality of media transmitted via network, wherein the raw images generated by the sever belong to different scene-modes, raw images of different scene-modes have different graphical contents. Decoded images corresponding to raw images of different scene-modes are processed by the same AI enhance module by using different sets of weighted parameters that are corresponding to the scene-modes. Therefore, the method of the invention can provide a good and steady quality of image-enhancing effect for all various kinds of raw images having completely different graphical contents.

In order to achieve the aforementioned objects, the invention provides a method for enhancing quality of media transmitted via network, which comprises:

STEP (A): executing a first application in a serve; said first application generating a plurality of raw images according to at least one command; said raw images being compressed by an encoder of the sever to form a plurality of encoded images;

STEP (B): executing a second application in a client device remote from the sever; the second application being relevant to and cooperative with the first application in such a manner that, the client device being operable by a user to generate said command;

STEP (C): said client device transmitting said command to the server via a network, and retrieving said encoded images from the server via the network according to the command;

STEP (D): said client device decoding said encoded images into a plurality of decoded images, and using an AI enhance module to enhance qualities of said decoded images in order to generate a plurality of enhanced images; wherein said AI enhance module processes said decoded images by using at least one algorithm which is defined by analyzing differences between said decoded images and said raw images in such a manner that, said enhanced images are visually more similar to the raw images than the decoded images do; and STEP (E): said client device outputting said enhanced images as displayed output images.

In a preferred embodiment, said at least one algorithm of the AI enhance module of the client device is defined by a training process of an artificial neural network module performed by the server; said training process comprises:

STEP (a): executing the first application in a training mode to generate a plurality of training raw images;

STEP (b): encoding said training raw images into a plurality of training encoded images by using said encoder;

STEP (c): decoding said training encoded images into a plurality of training decoded images by using a training decoder of the server;

STEP (e): said artificial neural network module accepting said training decoded images and processing said training decoded images one by one by using at least one training algorithm in order to generate a plurality of training output images; said at least one training algorithm having a plurality of training weighted parameters; and STEP (f): using a compare module to compare the differences between the training output images and their corresponding training raw images one by one, so as to modify said training weighted parameters of said at least one training algorithm according to the differences between each said training output image and its corresponding training raw image; said training weighted parameters being modified to minimize the differences between the training output images and their corresponding training raw images; each time when the training weighted parameters being modified, the modified training weighted parameters being fed back to the at least one training algorithm for processing another said training decoded image in STEP (e);

wherein, after a predetermined amount of the training output images and their corresponding training raw images are compared, and a predetermined times of the training weighted parameters are modified, the training weighted parameters are applied to the at least one algorithm of said AI enhance module of the client device.

In a preferred embodiment, when the training decoded images and the training output images have the same color formats, said artificial neural network module is a residual network module, and in STEP (e), each of the training output images is a sum of a corresponding training decoded image and an output of the residual network module for processing the corresponding training decoded image.

In a preferred embodiment, in STEP (f), the compare module employs a discriminator to compare the differences between the training output image and its corresponding training raw image for converging Generative Adversarial Networks (GAN) loss and modifying said training weighted parameters.

In a preferred embodiment, wherein the discriminator of the compare module is trained by the following:

the training raw images comprise n channels, wherein n is an integer greater than two; the training decoded images comprise m channels, wherein m is an integer greater than two;

in STEP (e), said artificial neural network module processes said m channels of training decoded images to generate n channels of training output images; said n channels of training output images are summed with the m channels of training decoded images to generate m+n channels of simulated false samples; said n channels of training raw images are summed with the m channels of training decoded images to generate m+n channels of simulated true samples;

in STEP (f), the m+n channels of simulated false samples and the m+n channels of simulated true samples are fed to the discriminator of the compare module for training an ability of the discriminator of the compare module to detect and recognize the simulated false samples and simulated true samples.

In a preferred embodiment, wherein:

a color coding format of the training raw images is either RGB or YUV444, another color coding format of the training decoded images is YUV420;

in STEP (e), said artificial neural network module includes a first neural network and a second neural network; the second neural network is a Convolutional Neural Network (CNN); the first neural network accepts and processes the training decoded images and generates a plurality of first output X2 images that have the same coding format with the training raw images; the second neural network accepts and processes the first output X2 images and generates a plurality of second output images; the first output X2 images and the second output images are summed to form the training output images;

in STEP (f), the compare module includes a first comparator and a second comparator; the first comparator compares the differences between the first output X2 images and their corresponding training raw images in order to train the first neural network; the second comparator compares the differences between the training output images and their corresponding training raw images in order to train the second neural network.

In a preferred embodiment, wherein, in STEP (e), the first neural network accepts and processes the training decoded images of YUV420 color coding format by using the following:

extracts Y-part data of the training decoded images, and the first neural network processes the Y-part data of the training decoded images in order to generate Y-part output data;

extracts UV-part data of the training decoded images, and uses two-times amplified first neural network to process the UV-part data of the training decoded images in order to generate UV-part output data;

sums the Y-part output data and the UV-part output data in order to generate the training output images.

In a preferred embodiment, wherein, in STEP (e), the first neural network accepts and processes the training decoded images of YUV420 color coding format by using the following:

the training decoded images comprise N channels, wherein N is an integer greater than 2;

extracts Y-part data of the training decoded images;

extracts UV-part data of the training decoded images, and uses two-times amplified first neural network to process the UV-part data of the training decoded images in order to generate UV-part output data with N−1 channels;

concatenates the Y-part data and the UV-part output data in order to generate the training output images.

In a preferred embodiment, wherein said at least one algorithm of the AI enhance module of the client device comprises a plurality of weighted parameters; said weighted parameters are depending from the differences between said decoded images and said raw images and are defined by a training process of an artificial neural network module performed by the server.

In a preferred embodiment, wherein said weighted parameters are pre-stored in the client device.

In a preferred embodiment, wherein said weighted parameters are downloaded from the sever to the client device when the second application is executed on the client device.

In a preferred embodiment, wherein:

the raw images generated by the first application are divided into a plurality of scene-modes, each said scene-mode includes a plurality of said raw images;

the weighted parameters are divided into a plurality of sets, each set includes a plurality of said weighted parameters and is corresponding to one of the scene-mode;

said decoded images corresponding to raw images of different said scene-modes are processed by the same AI enhance module by using weighted parameters of different said sets that are corresponding to the scene-modes.

In a preferred embodiment, wherein said weighted parameters of said sets are all pre-stored in the client device, whenever the scene-mode changes, a different set of weighted parameters corresponding to said scene-mode will be applied to the AI enhance module for generating the enhanced images.

In a preferred embodiment, wherein said weighted parameters are stored in the server, whenever the scene-mode changes, a different set of weighted parameters corresponding to said scene-mode will be downloaded from the sever to the client device, and then applied to the AI enhance module for generating the enhanced images.

All these objects are achieved by the method and system for enhancing quality of media transmitted via network in accordance with the present invention described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for enhancing quality of media transmitted via network uses an AI enhancing model built-in the client device to enhance the quality of video streams received from network. The AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images that are generated by the server. Such that, the enhanced images are visually more similar to the raw images than the decoded images do.

One use of the present invention is in cloud-based online games, where a player uses a client device to play a game on a server over a network. The server is responsive to commands by the user and generates video for the client device. Thus, for example, a user makes a move on the client device. The move is transmitted to the server device, which then recalculates an image that is transmitted back to the client device to be displayed thereon. In many games, the server generates the 2D images which include the 3D rendering of objects within the field of view.

Figure 1:
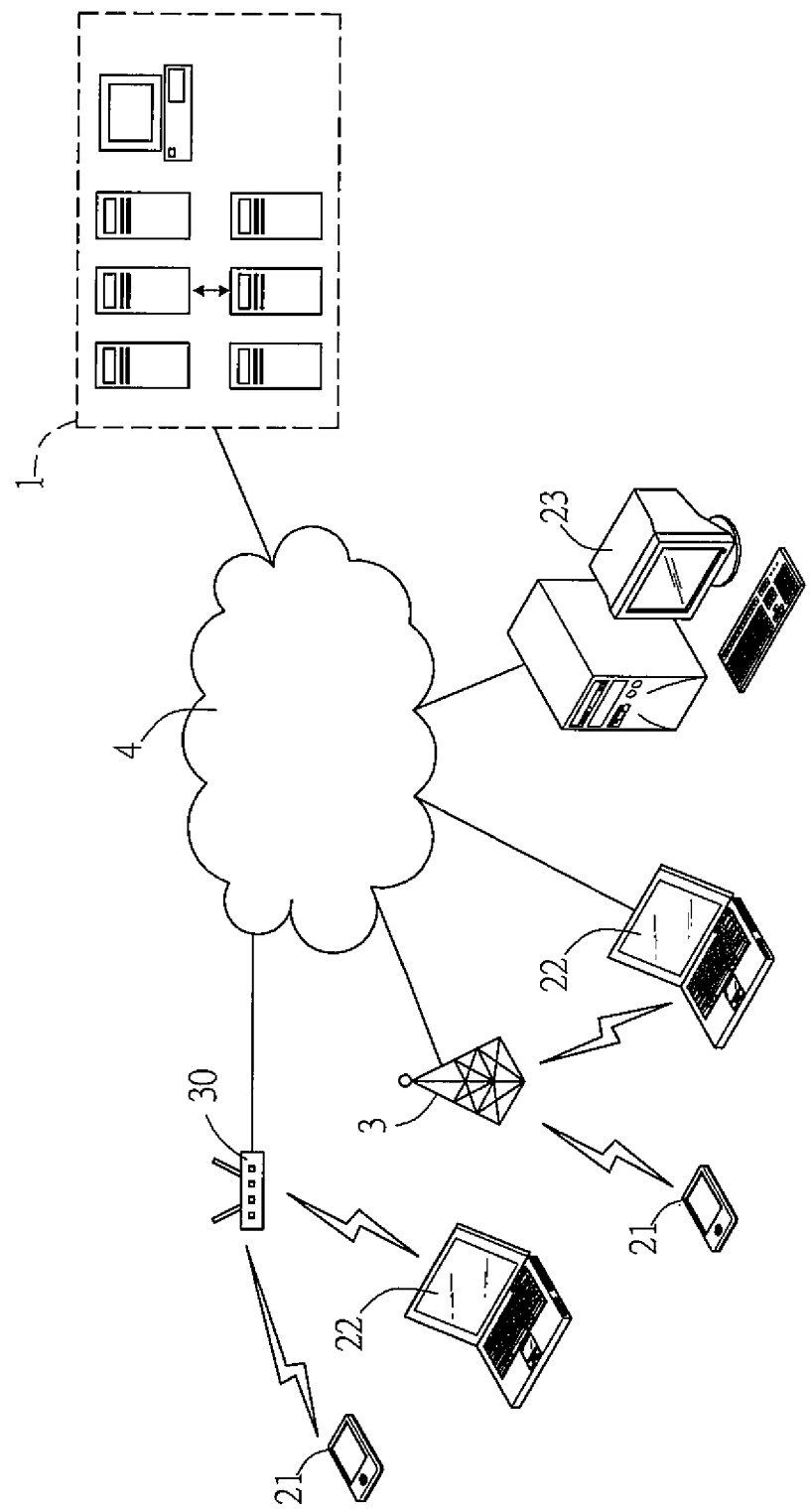
FIG. 1 is a schematic drawing illustrating a system for enhancing quality of media transmitted via network in accordance with the present invention.

Please refer to FIG. 1, which schematically illustrates a system for enhancing quality of media transmitted via network in accordance with the present invention. A server 1 is applied for providing the service of an application executed on the server 1, such service can be, but not limited to, a cloud-based online game service. A plurality of client devices 21, 22, 23 can connect (log in) to the server 1 via a network 4 to use the service provided by the application running on the server 1. In this embodiment, the network 4 is Internet, and the client devices 21, 22, 23 can be any electronic device having the ability to access the Internet, such like (but not limited to) a smart phone 21, a digital tablet, a notebook 22, a desktop computer 23, a video game player, or even a smart TV. Some of the client devices 21, 22 are connected wirelessly to the network 4 by means of a mobile station 3 or a wireless router 30, some others can be connected to the network 4 through a router in a wired manner. The application running on the server 1 generates a virtual 3D environment containing a plurality of 3D objects, some of them are movable or breakable according to the player's operations, others are not. In a preferred embodiment of the invention, for each client device, there will be one independent running instance of application. Which means, one application provides the service to one client device only, however, several applications can be executed on the same server for providing services to multiple client devices. The client device 21,22,23 connects to the server 1 via the network 4 in order to retrieve graphics containing at least some of the 3D objects generated by the application. The architecture of the system and the features thereof are illustrated in detail in FIG. 2 and its associated description.

Figure 2:
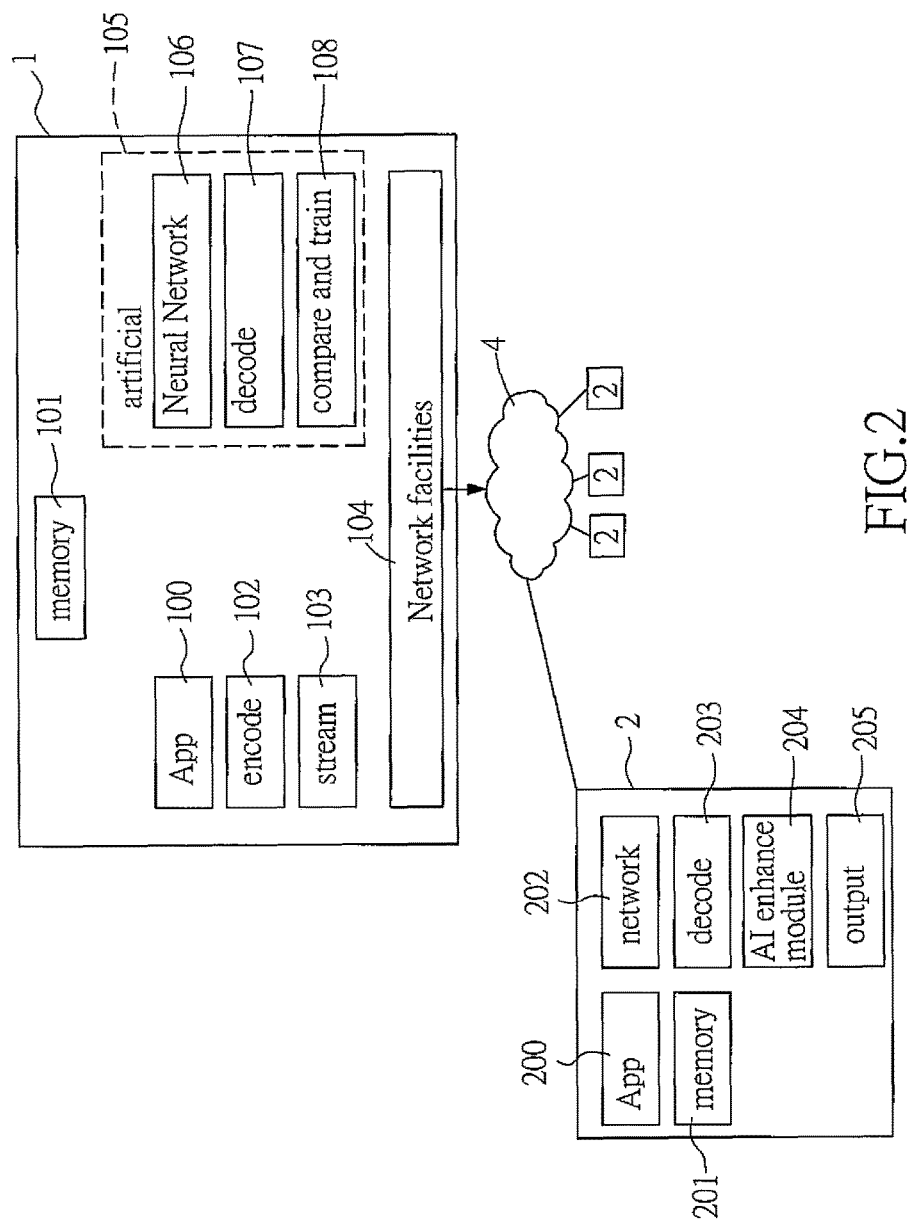
FIG. 2 is a schematic diagram showing an embodiment of a system architecture in accordance with the present invention.

FIG. 2 is a schematic diagram showing an embodiment of a system architecture in accordance with the present invention. Application (App) 100 is an application stored in the memory 101 for generating 3D graphic rendering result in the form of a series of raw images, generally a 3D game application, running on server 1. Encode 102 and stream 103 are encoding and streaming modules that can accept the raw images generated by the application 100, and encoding and streaming these raw images into a 2D video stream. The encoded 2D video stream is then transmitted via the network facilities 104 of sever to the client device 2 located remote from the server 1 through the network 4. Each client device 2 is pre-installed with an application 200 which is stored in the memory 201 of client device 2 and is relevant to and cooperative with the application 100 of sever 1. The application 200 of client device 2 establishes connection with the application 100 of sever 1, and retrieves the encoded 2D video stream from the sever 1 by using the network module 202. The retrieved 2D video stream is then decoded by a decode module 203 to generate decoded images. It is understood that, because of the processes of encoding, streaming and decoding, the qualities of decoded images are worse than the qualities of the raw images. The AI enhance module 204 built-in the client device 2 can enhance qualities of the decoded images in order to generate a plurality of enhanced images. In which, the AI enhance module 204 processes the decoded images by using at least one algorithm which is defined by analyzing differences between the decoded images and the raw images in such a manner that, the enhanced images are visually more similar to the raw images than the decoded images do. The enhanced images are then output to the screen (display panel) of client device 2 by the output module 205. In the present invention, the algorithms of the AI enhance module 204 of client device 2 is defined by a training process of an artificial neural network module 105 performed by the server 1. The artificial neural network module 105 is furnished in the sever 1 and comprises: an artificial neural network 106, a decode module 107 and a compare and train module 108. Embodiments of the training process of artificial neural network module 105 in accordance with the present invention will be illustrated in detail later.

Figure 3:
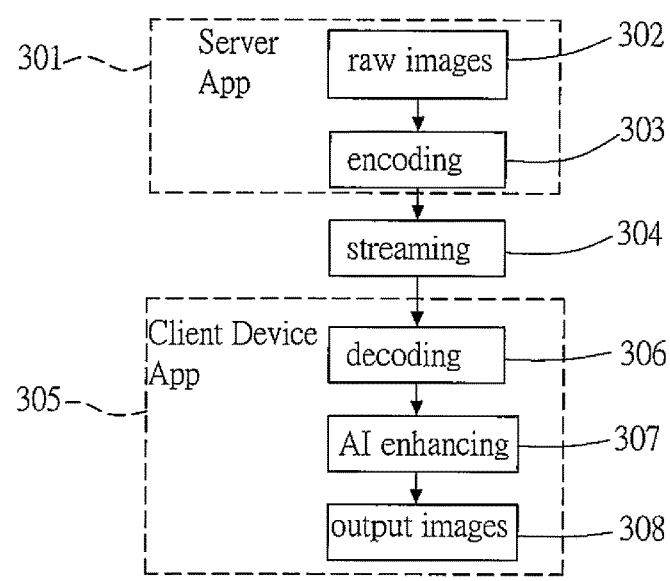
FIG. 3 is a schematic diagram showing an embodiment of the method for enhancing quality of media transmitted via network in accordance with the present invention.

FIG. 3 is a schematic diagram showing an embodiment of the method for enhancing quality of media transmitted via network in accordance with the present invention. The method, by employing the above illustrated system and architecture shown in FIGS. 2 and 3 of the invention, generally comprises the following steps:

STEP 301: executing a first application in a serve. The first application generates a plurality of raw images (STEP 302) according to at least one command. The raw images are then encoded and compressed by an encoder (STEP 303) of the sever to form a plurality of encoded images. The encoded images are then transmitted to a client device in the form of 2D video streaming (STEP 304) via the network.

A second application is executed in a client device remote from the sever (STEP 305). The second application is relevant to and cooperative with the first application in such a manner that, the client device is operable by a user to generate the command in order to use the services provided by the first application of the sever. The client device transmits the command to the server via the network, and retrieves the encoded images from the server via the network according to the command. And then, the client device decodes (STEP 306) the encoded images into a plurality of decoded images, and uses an AI enhance module (STEP 307) to enhance qualities of the decoded images in order to generate a plurality of enhanced images. Wherein, the AI enhance module processes the decoded images by using at least one algorithm which is pre-defined by analyzing differences between the decoded images and the raw images in such a manner that, the enhanced images are visually more similar to the raw images than the decoded images do. And then, the client device outputs the enhanced images (STEP 308) to the screen (display panel) as displayed output images.

In the present invention, the at least one algorithm of the AI enhance module of the client device comprises a plurality of weighted parameters. The weighted parameters are depending from the differences between the decoded images and the raw images and are defined by a training process of an artificial neural network module performed by the server. In one embodiment of the invention, the weighted parameters are pre-stored in the client device. In another embodiment, the weighted parameters are downloaded from the sever to the client device when the second application is executed on the client device.

In a preferred embodiment of the invention, graphical contents of raw images generated by the server might significantly varied when the gaming scenery is changed. For example, a gaming scenery of city might let the raw images of game to contain a plurality of buildings having simplified contours and different but generally unified colors. Another gaming scenery of dark cave might result the raw images of game to be monotonous in color with low Hue. Value and Chroma values, but have irregular yet obscure contours of landscape. A further gaming scenery of blossom garden might let the raw images of game to be full of vivid and colorful objects with detailed and complex contours. The method of the invention employs different sets of weighted parameters to suit different gaming scenery, such that the quality of output images enhanced by the same AI enhance module can be maintained at a high and steady level even when the graphical contents of raw images change severely.

Preferably, the raw images generated by the first application are divided into a plurality of scene-modes, each scene-mode includes a plurality of said raw images. The weighted parameters are divided into a plurality of sets, each set includes a plurality of weighted parameters and is corresponding to one of the scene-mode. The decoded images corresponding to raw images of different scene-modes are processed by the same AI enhance module by using weighted parameters of different sets that are corresponding to the scene-modes. In one embodiment of the invention, the weighted parameters of different sets are all pre-stored in the client device, whenever the scene-mode changes, a different set of weighted parameters corresponding to the scene-mode will be applied to the AI enhance module for generating the enhanced images. In another embodiment, the weighted parameters are all stored in the server, whenever the scene-mode changes, a different set of weighted parameters corresponding to that scene-mode will be downloaded from the sever to the client device, and then applied to the AI enhance module for generating the enhanced images.

Figure 4:
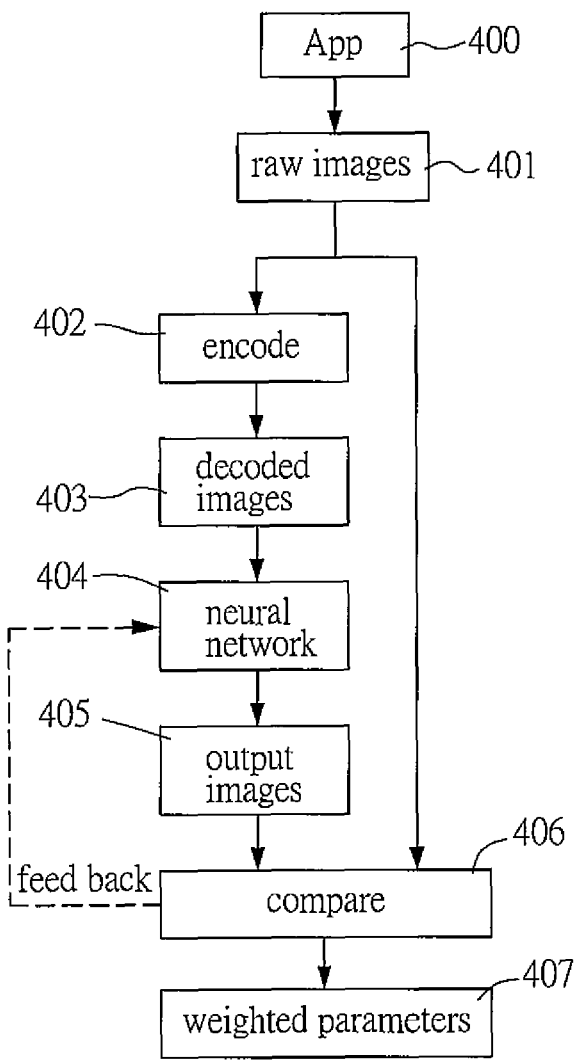
FIG. 4 is a schematic diagram showing the first embodiment of the training process of artificial neural network module 105 in accordance with the present invention.

FIG. 4 is a schematic diagram showing the first embodiment of the training process of artificial neural network module 105 in accordance with the present invention. In the present invention, the algorithms of AI enhance module 204 of the client device 2 is trained and defined by a training process of the artificial neural network module 105 performed by the server 1. The training process comprises the following steps:

STEP 400: executing the first application in a training mode to generate a plurality of training raw images (STEP 401);

STEP 402: encoding the training raw images into a plurality of training encoded images by using the encoder;

STEP 403: decoding the training encoded images into a plurality of training decoded images by using the training decoder of the server;

STEP 404: the artificial neural network module accepting the training decoded images and processing the training decoded images one by one by using at least one training algorithm in order to generate a plurality of training output images (STEP 405); the at least one training algorithm having a plurality of training weighted parameters; and STEP 406: using the compare and train module to compare the differences between the training output images and their corresponding training raw images one by one, so as to modify the training weighted parameters of the at least one training algorithm according to the differences between each training output image and its corresponding training raw image; the training weighted parameters being modified to minimize the differences between the training output images and their corresponding training raw images; each time when the training weighted parameters being modified, the modified training weighted parameters being fed back to the at least one training algorithm for processing another training decoded image in STEP 404. After a predetermined amount of the training output images and their corresponding training raw images are compared, and a predetermined times of the training weighted parameters are modified, the training weighted parameters (STEP 407) are applied to the at least one algorithm of said AI enhance module of the client device.

In the first embodiment of the invention, the training decoded image is input to the artificial neural network module in order to generate the training output image. The training output image and the training raw image are then compared in order to calculate the amount of error. And then, using a mathematical optimization algorithm such like Adam. SGD (Stochastic gradient descent), or RMSProp (Root Mean Square Propagation) to learn the weighted parameters (usually referred as weight w, bias b) of the artificial neural network, making the error as small as possible, such that the training output image will be closer to its corresponding training raw image. Different methods can be used to calculate the error (or similarity) to suit different requirements, for example, MSE (mean square error), L regularization (absolute value error), PSNR (peak signal-to-noise ratio), SSIM (structure similarity), GAN loss (generative adversarial networks loss), and etc. In the first embodiment, the following methods are employed to calculate the error: (1) weighted average of MSE, L1 and GAN loss; (2) MSE; (3) GAN loss and also training Discriminator in the same time; (4) weighted average of MSE and Edge of MSE. More detailed descriptions of the training process will be illustrated later.

Figure 5:
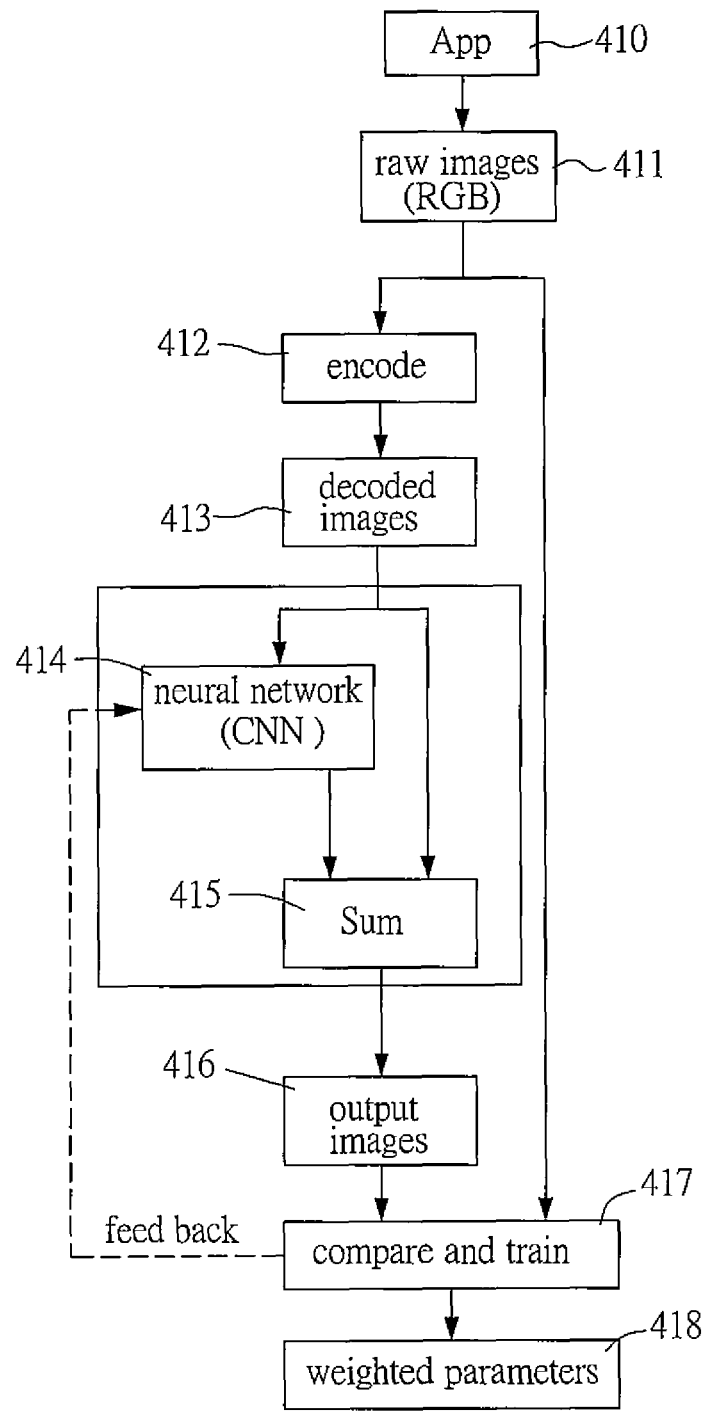
FIG. 5 is a schematic diagram showing the second embodiment of the training process of artificial neural network module 105 in accordance with the present invention.

FIG. 5 is a schematic diagram showing the second embodiment of the training process of artificial neural network module 105 in accordance with the present invention. The training process of the second embodiment comprises the following steps:

STEP 410: executing the first application in a training mode to generate a plurality of training raw images (STEP 411), wherein the color format of these training raw images is RGB;

STEP 412: encoding the training raw images into a plurality of training encoded images by using the encoder;

STEP 413: decoding the training encoded images into a plurality of training decoded images by using the training decoder of the server;

STEP 414: in the second embodiment, when the color formats of the training decoded images and the training output images are the same (both RGB in this embodiment), residual network module (Convolutional Neural Network, CNN) is used in the artificial neural network module; the output of the residual network module for processing the corresponding training decoded image being summed up (STEP 415) with a corresponding training decoded image; and then, the sum of the output of the residual network module and the training decoded image is output as the training out image (STEP 416); and STEP 417: using the compare and train module to compare the differences (calculate the error) between the training output images and their corresponding training raw images one by one, so as to modify the training weighted parameters of the at least one training algorithm according to the differences between each training output image and its corresponding training raw image; the training weighted parameters being modified to minimize the differences between the training output images and their corresponding training raw images; each time when the training weighted parameters being modified, the modified training weighted parameters being fed back to the artificial neural network for processing another training decoded image in STEP 414. After a predetermined amount of the training output images and their corresponding training raw images are compared, and a predetermined times of the training weighted parameters are modified, the training weighted parameters (STEP 418) are applied to the at least one algorithm of said AI enhance module of the client device.

Figure 6:
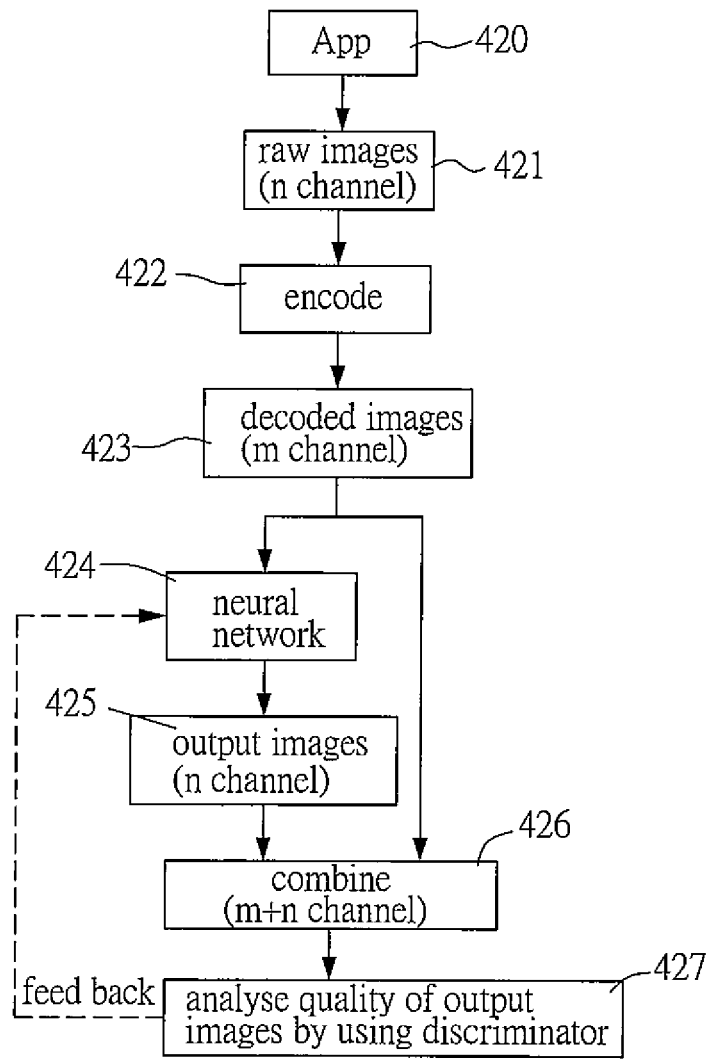
FIG. 6 is a schematic diagram showing the third embodiment of the training process of artificial neural network module 105 in accordance with the present invention.

FIG. 6 is a schematic diagram showing the third embodiment of the training process of artificial neural network module 105 in accordance with the present invention. In this third embodiment, the compare module employs a discriminator to compare the differences between the training output image and its corresponding training raw image for converging Generative Adversarial Networks (GAN) loss and modifying said training weighted parameters. The training process of the third embodiment comprises the following steps:

STEP 420: executing the first application in a training mode to generate a plurality of training raw images (STEP 421), wherein the training raw images comprise n channels, where n is an integer greater than two;

STEP 422: encoding the training raw images into a plurality of training encoded images by using the encoder;

STEP 423: decoding the training encoded images into a plurality of training decoded images by using the training decoder of the server; wherein the training decoded images comprise m channels, where m is an integer greater than two; and STEP 424: the artificial neural network module accepting the training decoded images and processing the training decoded images one by one by using at least one training algorithm in order to generate a plurality of training output images (STEP 425); the at least one training algorithm having a plurality of training weighted parameters; wherein the training output images comprise n channels; the training output images (n channels) and their corresponding training decoded images (m channels) are combined (STEP 426) to generate a plurality of training combined images (with m+n channels), and then, the training combined images are fed to a Discriminator (STEP 427) for analyzing the quality of the training output images, in order to train the artificial neural network.

Figure 7:
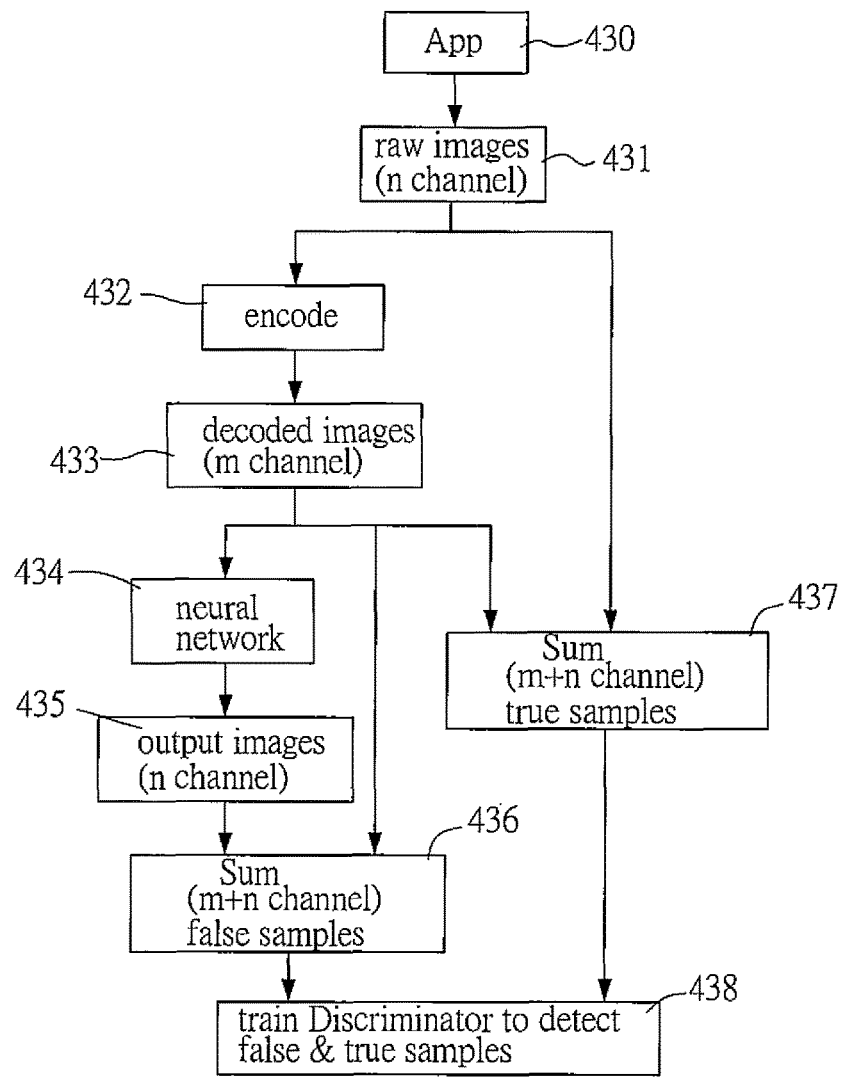
FIG. 7 is a schematic diagram showing an embodiment of the training process of Discriminator shown in FIG. 6.

FIG. 7 is a schematic diagram showing an embodiment of the training process of Discriminator shown in FIG. 6. The training process of Discriminator comprises the following steps:

STEP 430: executing the first application in a training mode to generate a plurality of training raw images (STEP 431), wherein the training raw images comprise n channels, where n is an integer greater than two;

STEP 432: encoding the training raw images into a plurality of training encoded images by using the encoder;

STEP 433: decoding the training encoded images into a plurality of training decoded images by using the training decoder of the server; wherein the training decoded images comprise m channels, where m is an integer greater than two;

STEP 434: the artificial neural network module accepting the training decoded images and processing the training decoded images (m channels) one by one by using at least one training algorithm in order to generate a plurality of training output images (STEP 435); the at least one training algorithm having a plurality of training weighted parameters; wherein the training output images comprise n channels;

STEP 436, the n channels of training output images are summed with the m channels of training decoded images to generate m+n channels of simulated false samples; in addition, the n channels of training raw images are summed with the m channels of training decoded images to generate m+n channels of simulated true samples (STEP 437); and STEP 438, the m+n channels of simulated false samples and the m+n channels of simulated true samples are fed to the Discriminator of the compare module for training an ability of the Discriminator to detect and recognize the simulated false samples and simulated true samples.

After the artificial neural network 105 (see FIG. 2) is well trained in the sever 1 side, the weighted parameters (weight w, bias b) are applied to the AI enhance module 204. The AI enhance module 204 and its associated weighted parameters (weight w, bias b) are downloaded to and saved in the client device 2. After then, whenever the client device accepts and decodes the encoded images of the 2D video streams, each decoded image will be processed by the AI enhance module in order to generate enhanced images. The client device then displays the enhanced images on its screen as the output images. The neural network can learn and enhance the color, brightness, and details of the images. Because of the encoding process and the format of streaming, some details of the raw images will be damaged or lost. A well-trained neural network can fix these damaged or lost details. In the embodiment of the invention, the neural network of the AI enhance module requires the following information to operate:

Related functions and parameters:

X: input image.

Conv2d(X, a, b, c, d, w, b): performed on X; amount of output channel=a; kernel_size=b; stride=c; padding size=2d convolution with bias of d; the weighted parameters of training are kernel w and bias b.

Conv2dTranspose(X, a, b, c, w, b)): performed on X; amount of output channel=a; kernel_size=b; stride=c; cropping size=2d transpose convolution with bias of d; the weighted parameters of training are kernel w and bias b.

σ(X): nonlinear activation function working on X.

uint8(x): to control and limit the value of floating point x between 0 and 255 (255 included), use round down method, transform to unsigned int8.

R(X, w): residual blocks working on X, which includes a lot of conv2d and batchnorm, each has its own weighted parameters to be trained (more information can be referred by the following web-site as reference: https://stats.stackexchange.com/questions/246928/what-exactlv-is-a-residual-learning-block-in-the-context-of-deep-residual-networ).

Since the input and output images might have different color coding format such like RGB. YUV420. YUV444, more discussions regarding to different color coding formats of the input and output images are discussed hereunder.

First Case: raw image is RGB, and output image is RGB

This case is the simplest one because both the input and output images are RGB images. In order to increase the processing speed, a relative large kernel size (such as 8×8, stride 4 for convolution and transpose convolution structures) is used to accelerate the calculations as fast as possible in order to handle the high resolution of Full HD of the images. Residual network is used in this case to make the convergence easier and more steady.

Related functions and parameters:

X: input image, which is RGB format, and each color is unsigned int8 format;

$$X_2 = \frac{X - 127.5}{128};$$

$Y$=uint8((Conv2dTranspose(σ(Conv2d($X2,a,b,c,d, w\_1,b\_1$)),$w\_2,b\_2$)+$X2$)*128+128);

w_1 is a matrix having a size of b*b*3*a; b_1 is a vector whose size is a;

w_2 is a matrix having a size of b*b*3*a; b_2 is a vector whose size is 3;

parameters used are:
the resolution of X is 1280×720;
a=128, b=10, c=5, d=0, σ=leaky relu with alpha=0.2;
a=128, b=9, c=5, d=4, σ=leaky relu with alpha=0.2;
a=128, b=8, c=4, d=0, σ=leaky relu with alpha=0.2;
if the client device has faster processing speed, then the following equation can be used:

$$Y=\text{uint8}((\text{Conv2}d\text{Transpose}(R(\sigma(\text{Conv2}d(X2,a,b,c,d,w\_1,b\_1)),w\_R),w\_2,b\_2)+X2)*128+128)$$

w_1 is a matrix having a size of b*b*3*a; b_1 is a vector whose size is a;
w_2 is a matrix having a size of b*b*3*a; b_2 is a vector whose size is 3;
wherein R is residual blocks having n layers:
wherein a lot of network layers are included, each has its own weighted parameters to be trained, which are collectively called as w_R;
parameters used are:
a=128, b=8, c=4, d=0, σ=leaky relu with alpha=0.2; n=2;
a=128, b=8, c=4, d=0, σ=leaky relu with alpha=0.2; n=6.
Second Case: raw image is YUV420, and output image is either RGB or YUV444

If the input image is YUV420, and the output image is RGB or YUV444, then, because the resolution and format of the input and out images are different. Residual network cannot be applied directly in this case. The method of the present invention decodes the YUV420 input image first, and then uses the neural network (called as network A, N=3) to process the decoded image to obtain an image with RGB or YUV444 format (called as X2). Then the image X2 is fed to the aforementioned neural network (Residual network) for training. In addition, same training method is also applied on the network A by comparing the errors between X2 and raw image, in order to train the network A.

X_y is the Y of the input image with YUV420 format, in the form of unsigned int8;
X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$$X2=\text{Conv2}d(X2\_y,3,e,1,w\_y,b\_y)+\text{Conv2}d\text{Transpose}(X2\_uv,3,f,2,w\_uv,b\_uv);$$

w_y is a matrix having a size of e*e*1*3; b_y is a vector whose size is 3;
w_uv is a matrix having a size of f*f*3*2; b_uv is a vector whose size is 3;
The above illustration is the first embodiment of the neural network A.
At last, the equation for output the output image is the same as the embodiment when the input and output images are both RGB format.

$$Y=\text{uint8}((\text{Conv2}d\text{Transpose}(a(\text{Conv2}d(X2,a,b,c,d,w1,b\_1)),w\_2,b\_2)+X2)*128+128)$$

w_1 is a matrix having a size of b*b*3*a; b_1 is a vector whose size is a;
w_2 is a matrix having a size of b*b*3*a; b_2 is a vector whose size is 3;
parameters used are also the same as the embodiment when the input and output images are both RGB:
the resolution of X is 1280×720;
a=128, b=8, c=4, d=0, e=1, f=2, σ=leaky relu with alpha=0.2;
a=128, b=8, c=4, d=0, e=1, f=2. σ=leaky relu with alpha=0.2.

Figure 8:
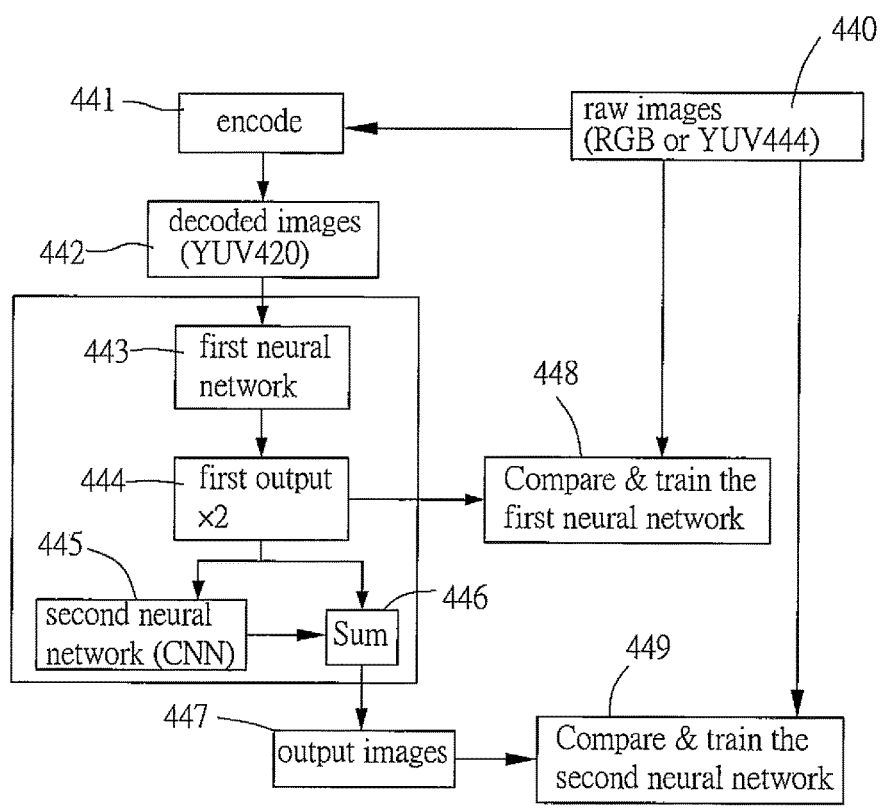
FIG. 8 is a schematic diagram showing an embodiment of the training process of neural network when the raw image is YUV420, and the output image is either RGB or YUV420.

Please refer to FIG. 8 which is a schematic diagram showing an embodiment of the training process of neural network when the raw image is YUV420, and the output image is either RGB or YUV420. The training process of neural network comprises the following steps:

STEP 440: executing the first application in a training mode to generate a plurality of training raw images, wherein the training raw images are either RGB or YUV444 format;

STEP 441: encoding the training raw images into a plurality of training encoded images by using the encoder;

STEP 442: decoding the training encoded images into a plurality of training decoded images by using the training decoder of the server; wherein the training decoded images are YUV420 format;

STEP 443: the artificial neural network module includes a first neural network and a second neural network; the first neural network (also called as neural network A) accepting the training decoded images and processing the training decoded images (YUV420) one by one by using at least one training algorithm in order to generate a plurality of first output X2 images (also called as X2, see STEP 444) that have the same coding format with the training raw images; the at least one training algorithm having a plurality of training weighted parameters;

STEP 445, the second neural network is a Convolutional Neural Network (CNN); the second neural network (also called as CNN neural network) accepts the first output X2 images and processes the first output X2 images one by one by using at least one training algorithm in order to generate a plurality of second output images; the at least one training algorithm having a plurality of training weighted parameters; the first output X2 images and the second output images are then summed (STEP 446) to form the training output images (STEP 447);

the compare module includes a first comparator and a second comparator; in STEP 448, the first comparator compares the differences between the first output X2 images and their corresponding training raw images in order to train the first neural network; in STEP 449, the second comparator compares the differences between the training output images and their corresponding training raw images in order to train the second neural network.

Figure 9:
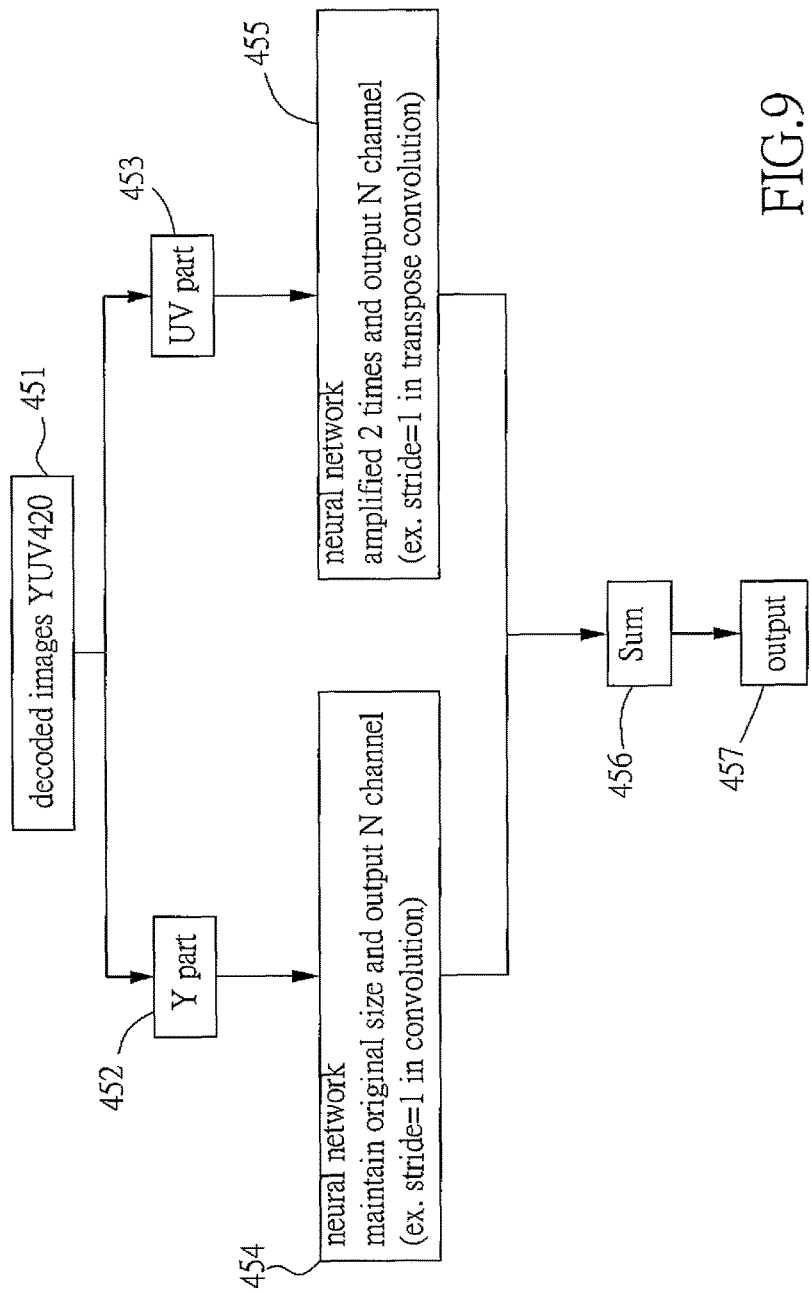
FIG. 9 is a schematic diagram showing an embodiment of process to handle the decoded images with YUV420 format in accordance with the invention.

FIG. 9 is a schematic diagram showing an embodiment of process to handle the decoded images with YUV420 format in accordance with the invention. The process to handle the decoded images with YUV420 format comprises:

STEP 451, the first neural network accepts and processes the training decoded images of YUV420 color coding format by using the following:

STEP 452, extracts Y-part data of the training decoded images, and the neural network with standard size processes the Y-part data of the training decoded images in order to generate Y-part output data with N channels (ex. Stride=1 in convolution; see STEP 454);

STEP 453, extracts UV-part data of the training decoded images, and uses two-times amplified first neural network to process the UV-part data of the training decoded images in order to generate UV-part output data with N channels (ex. Stride=1 in convolution; see STEP 455);

STEP 456, sums the Y-part output data and the UV-part output data in order to generate the training output images (STEP 457).

Third Case: raw image is YUV420, and output image is either YUV444 (another method which is faster)

If the input image is YUV420, and the output image is YUV444, then, in addition to the method previously described, there is another method to perform the first neural network (neural network A), which is a special case with faster speed. The decoded image with YUV420 format is firstly transformed to an image of YUV444 (also called as X2) by using the first neural network (neural network A); and then, the X2 is fed to the aforementioned neural network (Residual network) for training. In addition, same training method is also applied on the network A by comparing the errors between X2 and raw image, in order to train the network A.

X_y is the Y of the input image with YUV420 format, in the form of unsigned int8;

X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$$X3\_uv = Conv2dTranspose(X2\_uv, 2, 2, 2, w\_uv, b\_uv)$$

w_uv is a matrix having a size of 2*2*2*2; b_uv is a vector whose size is 2;

$$X2 = concat(X2\_y, X3\_uv);$$

the above descriptions refer to another embodiment of the neural network A, the function "concat" is to connect the input following the direction of channels.

At last, the equation for output the output image is the same as the embodiment when the input and output images are both RGB format.

$$Y = uint8((Conv2dTranspose(a(Conv2d(X2,a,b,c,d, w\_1,b\_1)),w\_2,b\_2)+X2)*128+128);$$

w_1 is a matrix having a size of b*b*3*a; b_1 is a vector whose size is a;

w_2 is a matrix having a size of b*b*3*a; b_2 is a vector whose size is 3;

parameters used are also the same as the embodiment when the input and output images are both RGB:

the resolution of X is 1280×720;
a=128, b=10, c=5, d=0. σ=leaky relu with alpha=0.2;
a=128, b=9, c=5, d=4, σ=leaky relu with alpha=0.2;
a=128, b=8, c=4, d=0, σ=leaky relu with alpha=0.2.

Figure 10:
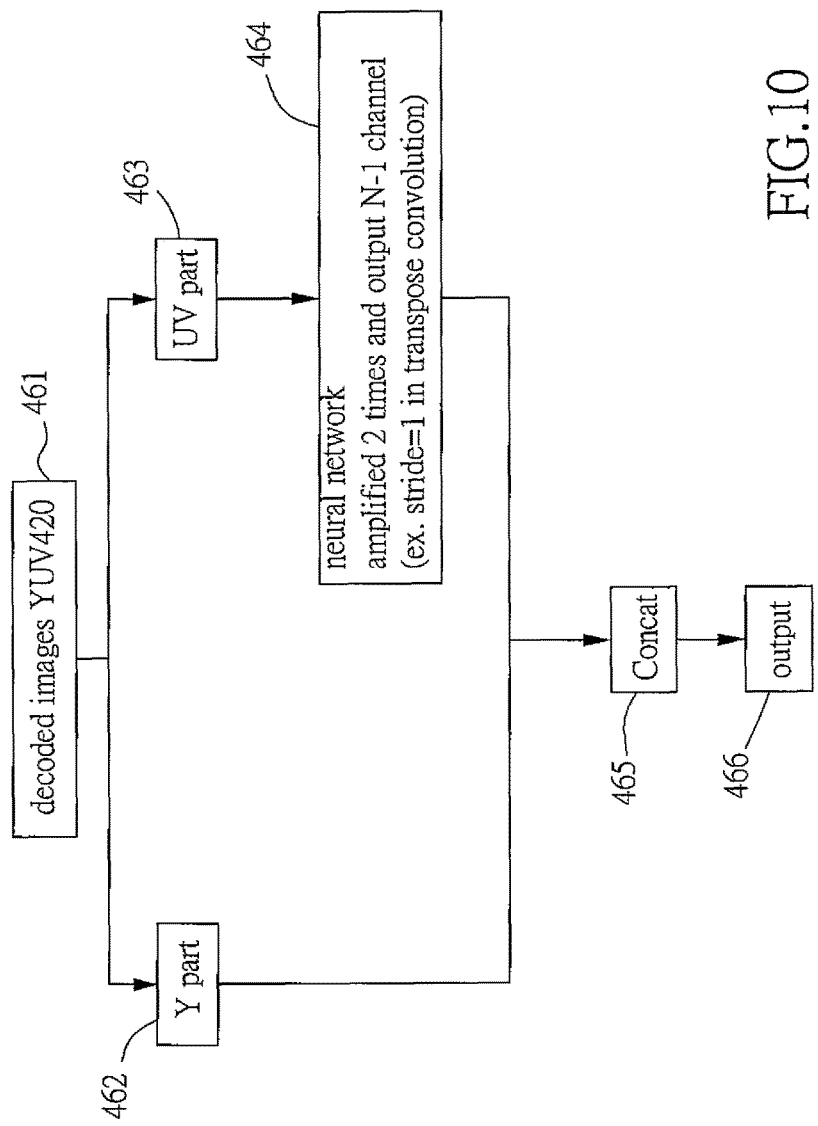
FIG. 10 is a schematic diagram showing another embodiment of process to handle the decoded images with YUV420 format in accordance with the invention.

FIG. 10 is a schematic diagram showing another embodiment of process to handle the decoded images with YUV420 format in accordance with the invention. The process to handle the decoded images with YUV420 format comprises:

STEP 461, the first neural network accepts and processes the training decoded images of YUV420 color coding format by using the following steps, wherein, the training decoded images comprise N channels, wherein N is an integer greater than 2;

STEP 462, extracts Y-part data of the training decoded images in order to generate Y-part output data;

STEP 463, extracts UV-part data of the training decoded images, and uses two-times amplified first neural network to process the UV-part data of the training decoded images in order to generate UV-part output data with N−1 channels (ex. Stride=1 in transpose convolution; see STEP 464);

STEP 465. Concat (concatenates) the Y-part output data and the UV-part output data in order to generate the training output images (STEP 466).

Fourth Case: raw image is YUV420, and output image is also YUV420

If the input image is YUV420, and the output image is also YUV420, then the process is similar to RGB-to-RGB. However, because the input format and the out format are different, different methods of convolutions are applied for different channels. For example, when the neural network of kernel size 8×8, stride 4 is used in Y-part of image, then the neural network will change to kernel size 4×4, stride 2 for handling the UV-part of image.

X_y is the Y of the input image with YUV420 format, in the form of unsigned int8;

X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$$X3 = a(Conv2d(X2\_y,a,b,c,w\_y,b\_y) + Conv2d(X2\_uv,a, b/2,c/2,w\_uv,b\_uv))$$

w_y is a matrix having a size of b*b*1*a; b_y is a vector whose size is a;

w_uv is a matrix having a size of (b/2)*(b/2)*2*a; b_uv is a vector whose size is a;

$$X4y = Conv2dTranspose(X3,1,b,c,w\_1,b\_1) + X2y$$

$$X4\_uv = Conv2dTranspose(X3,2,b/2,c/2,w\_2,b\_2) + X2\_uv;$$

w_1 is a matrix having a size of b*b*1*a; b_1 is a vector whose size is 1;

w_2 is a matrix having a size of (b/2)*(b/2)*2*a; b_2 is a vector whose size is 2;

Final output:

$$Y\_y = uint8(X4\_y*128+128)$$

$$Y\_uv = uint8(X4\_uv*128+128)$$

Parameters used:
a=128, b=8, c=4, d=0, e=1, f=2, σ=leaky relu with alpha=0.2;
a=128, b=8, c=4, d=0, e=2, f=2. σ=leaky relu with alpha=0.2.

The detailed descriptions of the parameters used in the invention are illustrated below:

Training parameters:

the initial values of the weighted parameters are arranged regarding to Gaussian distribution, mean=0, stddev=0.02;

training process uses Adam algorithm, learning rate=1e-4, beta1=0.9;

mini batch size=1;

the primary error function is:

$$100*(L2+L2e)+\lambda*L1+\gamma*D+\alpha*Lg;$$

the parameters used in standard are:
λ=0, γ=0, α=0

$\lambda=0, \gamma=0, \alpha=100$
$\lambda=0, \gamma=1, \alpha=0$
$\lambda=10, \gamma=0, \alpha=0$
$\lambda=10, \gamma=0, \alpha=100$
$\lambda=10, \gamma=1, \alpha=0$ wherein:

L2=mean$((T-Y)^2)$; wherein mean is average, T is the training object;

L1=mean$(|T-T|)$; wherein mean is average, T is the training object;

D is the GAN loss, using ordinary GAN training methods to train the Discriminator in order to distinguish (X,Y) and (X,T).

The equation of Lg is:
for an image of WxH, $Y\_dx(i,j)=Y(i+1,j)-Y(i,j) 0<=i<W-1, 0<=j<H$ $T\_dx(i,j)=T(i+1,j)-T(i,j) 0<=i<W-1, 0<=j<H$ $Y\_dy(i,j)=Y(i,j+1)-Y(i,j) 0<=i<W, 0<=j<H-1$ $T\_dy(i,j)=T(ij+1)-T(i,j) 0<=i<W, 0<=j<H-1$ $Lg=\text{mean}((T_{dx}-Y_{dx})^2)+\text{mean}((T_{dy}-Y_{dy})^2)$ Under the RGB mode, the training object T is the original raw images of RGB gaming images.

Under the YUV444 mode, the training object T is the original raw images of RGB gaming images.

Under the modes of RGB→RGB and YUV420→YUV420. L2e=0.

Under the modes of YUV420→RGB and YUV420→YUV444, $L_{2e}=\text{mean}((T-X_2)^2)$ It can be understood from the above descriptions that, the method for enhancing quality of media transmitted via network of the invention has the following advantages:

can keep training the neural network anytime according to various images having different contents, so as to perform different enhancing effects on different image contents; for example, for images with cartoon style, reality style, or different scenes and so on, different weighted parameters w, b can be either pre-stored in or dynamically downloaded to the client device;

regarding to the way to determine which mode should the raw images belong to, the neural network in the sever side can automatically determine the mode of raw images, and transmit such information to the client device; because the contents of raw images have their consistency, such determining process can be performed periodically by the sever, says once per second; however, in another embodiment, the process to determine the mode of images can also be performed periodically by the client device, says once per several seconds, according to the calculating ability of client device;

training is performed according to real video images, the increased level of enhancement can be actually measured; for example, when using the method of the invention to enhance the video images with resolution 1280×720 and bitrate 3000, the PSNR value of similar scene can increase around 1.5~2.2 db, it is proved that the method of the invention can truly improve the quality of output images and also make the output images to be visually more similar to the quality of original raw images; and is unlike those well-known image enhancing technologies which can merely increase the contrast, smoothing and color filtering of the output images;

by using simplified model of algorithms of neural network, and using large kernel, large stride value, the resolution of neural network is decreased rapidly, and the processing speed of the model can vastly increased, even a client device with limited calculating ability can achieve the goal of output images with 60 fps and HD resolution;

by implementing transformation of color format (YUV420 and RGB) into the neural network, and taking the advantages that the UV channel has lower resolution than the Y channel, the stride value of UV channel is set to be a half of the Y channel, in order to increase the calculating speed of neural network.

While the present invention has been particularly shown and described with reference to a preferred embodiment, it will be understood by those skilled in the art that various changes in form and detail may be without departing from the spirit and scope of the present invention.

What is claimed is:

1. A method for enhancing quality of media transmitted via network, comprising:

executing a first application in a server; said first application generating a plurality of raw images according to at least one command; said raw images being compressed by an encoder of the server to form a plurality of encoded images;

executing a second application in a client device remote from the sever; the second application being relevant to and cooperative with the first application in such a manner that, the client device being operable by a user to generate said command;

said client device transmitting said command to the server via a network, and retrieving said encoded images from the server via the network according to the command;

said client device decoding said encoded images into a plurality of decoded images, and using an AI enhance module to enhance qualities of said decoded images in order to generate a plurality of enhanced images; wherein said AI enhance module processes said decoded images by using at least one algorithm which is defined by analyzing differences between said decoded images and said raw images in such a manner that, said enhanced images are visually more similar to the raw images than the decoded images do; and said client device outputting said enhanced images as displayed output images;

wherein said at least one algorithm of the AI enhance module of the client device is defined by a training process of an artificial neural network module performed by the server; said training process comprises:

executing the first application in a training mode to generate a plurality of training raw images;

encoding said training raw images into a plurality of training encoded images by using said encoder;

decoding said training encoded images into a plurality of training decoded images by using a training decoder of the server;

said artificial neural network module accepting said training decoded images and processing said training decoded images one by one by using at least one training algorithm in order to generate a plurality of training output images; said at least one training algorithm having a plurality of training weighted parameters; and using a compare module to compare the differences between the training output images and their corresponding training raw images one by one, so as to modify said training weighted parameters of said at least one training algorithm according to the differences between each said training output image and its corresponding training raw image; said training weighted parameters being modified to minimize the differences between the training output images and their corresponding training raw images; each time when the training weighted parameters being modified, the modified training weighted parameters being fed back to the at least one training algorithm for processing another said training decoded image in the step of said artificial neural network module accepting said training decoded images;

wherein, after a predetermined amount of the training output images and their corresponding training raw images are compared, and a predetermined times of the training weighted parameters are modified, the training weighted parameters are applied to the at least one algorithm of said AI enhance module of the client device.

2. The method of claim 1, wherein, when the training decoded images and the training output images have the same color formats, said artificial neural network module is a residual network module, and in the step of said artificial neural network module accepting said training decoded images, each of the training output images is a sum of a corresponding training decoded image and an output of the residual network module for processing the corresponding training decoded image.

3. The method of claim 1, wherein, in the step of using a compare module to compare, the compare module employs a discriminator to compare the differences between the training output image and its corresponding training raw image for converging Generative Adversarial Networks (GAN) loss and modifying said training weighted parameters.

4. The method of claim 3, wherein the discriminator of the compare module is trained by the following:
the training raw images comprise n channels, wherein n is an integer greater than two; the training decoded images comprise m channels, wherein m is an integer greater than two;
in the step of said artificial neural network module accepting said training decoded images, said artificial neural network module processes said m channels of training decoded images to generate n channels of training output images; said n channels of training output images are summed with the m channels of training decoded images to generate m+n channels of simulated false samples; said n channels of training raw images are summed with the m channels of training decoded images to generate m+n channels of simulated true samples;
in the step of using a compare module to compare, the m+n channels of simulated false samples and the m+n channels of simulated true samples are fed to the discriminator of the compare module for training an ability of the discriminator of the compare module to detect and recognize the simulated false samples and simulated true samples.

5. The method of claim 1, wherein:
a color coding format of the training raw images is either RGB or YUV444, another color coding format of the training decoded images is YUV420;
in the step of said artificial neural network module accepting said training decoded images, said artificial neural network module includes a first neural network and a second neural network; the second neural network is a Convolutional Neural Network (CNN); the first neural network accepts and processes the training decoded images and generates a plurality of first output X2 images that have the same coding format with the training raw images; the second neural network accepts and processes the first output X2 images and generates a plurality of second output images; the first output X2 images and the second output images are summed to form the training output images;
in the step of using a compare module to compare, the compare module includes a first comparator and a second comparator; the first comparator compares the differences between the first output X2 images and their corresponding training raw images in order to train the first neural network; the second comparator compares the differences between the training output images and their corresponding training raw images in order to train the second neural network.

6. The method of claim 5, wherein, in the step of said artificial neural network module accepting said training decoded images, the first neural network accepts and processes the training decoded images of YUV420 color coding format by using the following:
extracts Y-part data of the training decoded images, and the first neural network processes the Y-part data of the training decoded images in order to generate Y-part output data;
extracts UV-part data of the training decoded images, and uses two-times amplified first neural network to process the UV-part data of the training decoded images in order to generate UV-part output data;
sums the Y-part output data and the UV-part output data in order to generate the training output images.

7. The method of claim 5, wherein, in the step of said artificial neural network module accepting said training decoded images, the first neural network accepts and processes the training decoded images of YUV420 color coding format by using the following:
the training decoded images comprise N channels, wherein N is an integer greater than 2;
extracts Y-part data of the training decoded images;
extracts UV-part data of the training decoded images, and uses two-times amplified first neural network to process the UV-part data of the training decoded images in order to generate UV-part output data with N−1 channels;
concatenates the Y-part data and the UV-part output data in order to generate the training output images.

8. The method of claim 1, wherein said at least one algorithm of the AI enhance module of the client device comprises a plurality of weighted parameters; said weighted parameters are depending from the differences between said decoded images and said raw images and are defined by said training process of said artificial neural network module performed by the server.

9. The method of claim 8, wherein said weighted parameters are pre-stored in the client device.

10. The method of claim 8, wherein said weighted parameters are downloaded from the sever to the client device when the second application is executed on the client device.

11. The method of claim 8, wherein:
the raw images generated by the first application are divided into a plurality of scene-modes, each said scene-mode includes a plurality of said raw images;

the weighted parameters are divided into a plurality of sets, each set includes a plurality of said weighted parameters and is corresponding to one of the scene-mode;

said decoded images corresponding to raw images of different said scene-modes are processed by the same AI enhance module by using weighted parameters of different said sets that are corresponding to the scene-modes.

12. The method of claim 11, wherein said weighted parameters of said sets are all pre-stored in the client device, whenever the scene-mode changes, a different set of weighted parameters corresponding to said scene-mode will be applied to the AI enhance module for generating the enhanced images.

13. The method of claim 11, wherein said weighted parameters are stored in the server, whenever the scene-mode changes, a different set of weighted parameters corresponding to said scene-mode will be downloaded from the sever to the client device, and then applied to the AI enhance module for generating the enhanced images.

* * * * *